United States Patent [19]

Ruhl

[11] 4,213,645
[45] Jul. 22, 1980

[54] ONE-PIECE HINGED GUARD

[75] Inventor: Edward A. Ruhl, Southfield, Mich.

[73] Assignee: USM Corporation, Farmington, Conn.

[21] Appl. No.: 915,134

[22] Filed: Jun. 13, 1978

[51] Int. Cl.² ............................................. B60R 19/02
[52] U.S. Cl. .................................................. 293/145
[58] Field of Search ............... 293/108, 109, 110, 142, 293/143, 145

[56] References Cited

U.S. PATENT DOCUMENTS

| 3,938,842 | 2/1976 | Ruhl | 293/71 R |
| 4,073,528 | 2/1978 | Klie | 293/98 |
| 4,109,951 | 8/1978 | Weller | 293/108 |

Primary Examiner—John J. Love
Assistant Examiner—John A. Carroll
Attorney, Agent, or Firm—Aubrey C. Brine; Richard B. Megley; Vincent A. White

[57] ABSTRACT

A one-piece molded plastic guard structure comprises, in integrally hinged relation, an inner foamed portion having pocket-defining ribs or webs with energy dissipating properties, an unfoamed cover portion formed to enclose and protect the inner portion, and means for securing the cover and inner portions, when closed, to a support. A representative use, for instance, is to mount the structure on an automotive bumper as a guard, providing energy absorbtion characteristics precluding bumper damage upon low impacts. Releasable retention of the cover portion in closed relation to the inner foamed portion may be provided by molded interengageable latches formed on the cover portion and receivable in a correspondingly shaped formation in the inner portion.

6 Claims, 8 Drawing Figures

U.S. Patent   Jul. 22, 1980   Sheet 1 of 2   4,213,645
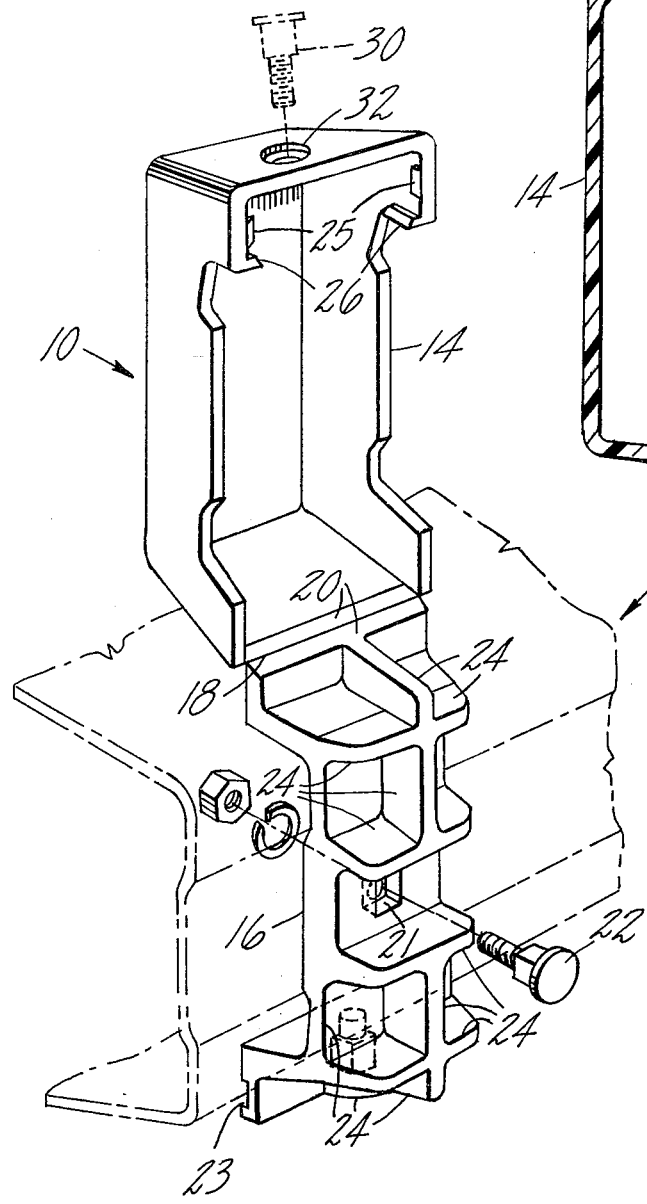
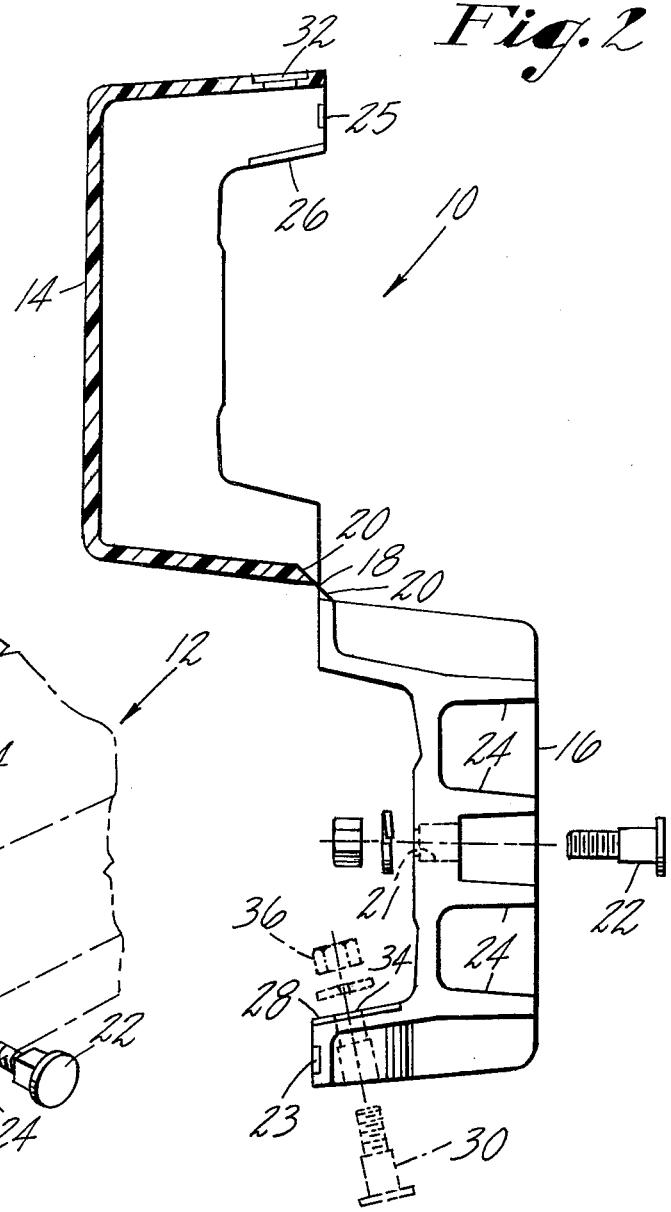

U.S. Patent  Jul. 22, 1980  Sheet 2 of 2  4,213,645
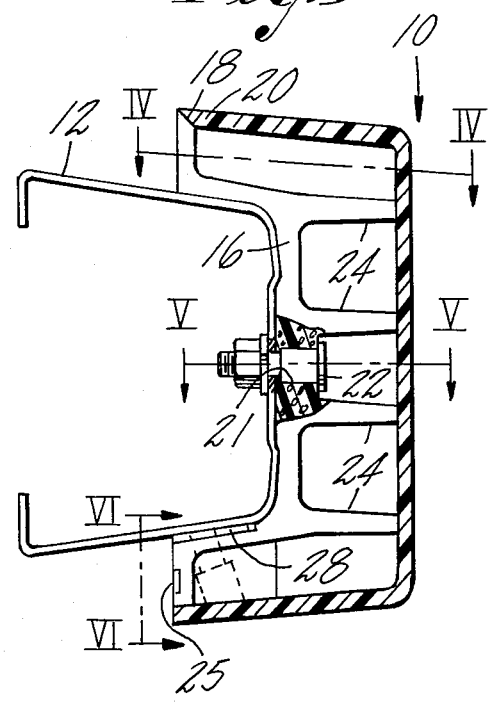
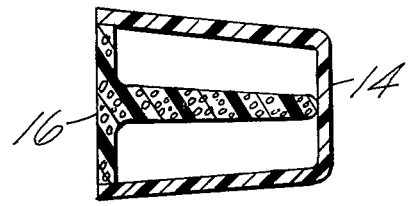
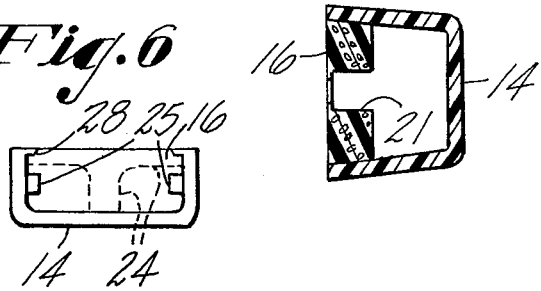
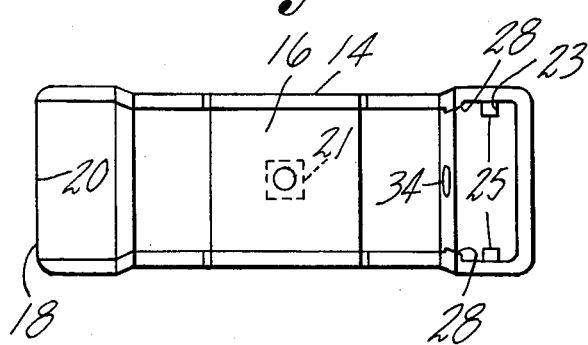
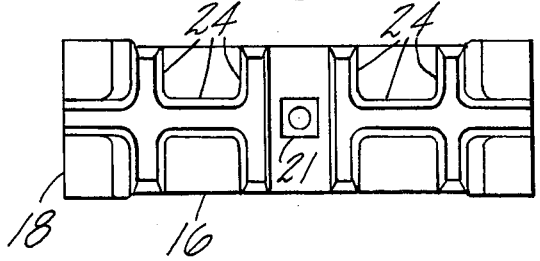

ONE-PIECE HINGED GUARD

CROSS-REFERENCE TO RELATED APPLICATION

An application Ser. No. 759,256 filed Jan. 14, 1977 in my name discloses a unitary plastic hinged article, one portion being foamed and having another, thinner unfoamed flexing portion constituting a joint.

BACKGROUND OF THE INVENTION

This invention relates to unitary hinged guards. Since, in general, non-foamed plastic articles may be more rigid, shiny and colorful whereas foamed plastic is commonly more compressible, energy absorbent and lack-lustre, there is often a need for combining in one article plastic materials having both classes of characteristics. As herein typified, for instance, a protective guard such as may be combined with a bumper needs to be of attractive exterior but be resilient; it should be resistant to impact, of lightweight for its strength, and easily mountable.

SUMMARY OF THE INVENTION

To these ends and as herein shown, two generally U-shaped sections, one foamed and one-nonfoamed, are interconnected along a common upper edge constituting a tough, non-foamed hinge whereby, when the foamed section has been mounted on a bumper for instance, the non-foamed section may be swung downwardly and closed thereon to envelope the foamed section. Preferably the rigidity of the assembly when closed is enhanced by reason of the foamed section comprising cellular or honeycomb type ribs or walls arranged to be engaged endwise by the closed non-foamed over section. In its closed relation the structure thus forms a plurality of substantially airtight compartments. Any of a variety of fastener means may be used to secure the foamed section, upon a bumper for instance, that portion of the cover section remote from the hinge being releasably latchable upon the foamed section whereby access to the fastener means is readily attained. The one-piece structure is conveniently moldable in its entirety from the same melt filling both sides of a mold.

BRIEF DESCRIPTION OF THE DRAWINGS

The foregoing and other features of the invention will now be more particularly described in connection with an illustrative embodiment, and with reference to the accompanying drawings thereof, in which:

FIG. 1 is a perspective view in open condition of a one-piece hinged bumper guard to be mounted upon a bumper;

FIG. 2 is a view in side elevation of the lower foamed section of the guard of FIG. 1, a cover or non-foamed upper section being shown in section above their common hinge;

FIG. 3 is a view similar to FIG. 2 but with the cover swung closed and latched in protective relation on the bumper;

FIG. 4 is a transverse section taken on the line IV—IV in FIG. 3;

FIG. 5 is a transverse section taken on the line V—V of FIG. 3;

FIG. 6 is a detail taken in the direction of the arrows VI—VI in FIG. 3 to show a latch;

FIG. 7 is a view of the back of the closed outer and inner sections; and

FIG. 8 is a front view of the foamed section of the structure.

DESCRIPTION OF THE PREFERRED EMBODIMENT

Assuming my novel plastic guard 10 (FIGS. 1, 2) is for mounting on a bumper generally designated 12 as shown in FIGS. 1 and 3, the one-piece assembly is a unitary molding an upper outer section 14 of which is non-foamed and substantially rigid, whereas a lower section 16 is of foamed plastic. The section 14 will usually have an aesthetically pleasing outer surface. The sections are generally U-shaped and have a common non-foamed hinge edge portion 18 whereby the section 14 can serve as a cover when swung downwardly to envelop the section 16 as shown in FIG. 3. Portions 20,20 on opposite sides of the hinge 18 are preferably V-shaped in section and merge at the hinge. The hinged cover is securely fastened at the lower extremity by means of an ancillary attachment or integrally molded snap-retaining feature designated 23,25.

As indicated in FIG. 3 the foamed section 16 may have a central aperture 21 through which a suitable fastener, for instance a bolt 22, extends for securing the guard assembly to the bumper 12. The U-shape of the section 16 is adapted to fit snugly on the bumper and, for increased rigidity, is formed with right angularly intersecting ribs or walls 24 defining a plurality of air pockets. The walls 24 are dimensioned and shaped to be engaged at their outer ends by the cover section 14 upon closure thereof thus providing a series of substantially air-tight compartments having energy dissipating properties. For holding the section 14 releasably closed, it is preferably formed at spaced apart edges remote from the hinge 18 with releasable latching shoulders 26,26 arranged to snap-fit over corresponding shoulders 28,28 formed on the foamed section 16. Optionally, for permanently securing the closed assembly to the mounting 12, a bolt 30 extends through a hold 32 in the cover 14, a hole 34 in the section 16, and a bore in the bumper 12 to receive a nut 36 (FIG. 2). Although the upper and lower sections 14,16 are herein shown substantially symmetrical in their right and left portions, it will be apparent this is a matter of choice.

One material found satisfactory in making the one-piece molded guard above described is the ionomer resin carrying the tradename "Surlyn" and available from E. DuPont de Nemours & Co. The guard may then suitably have its foamed section of 0.80 density, for example. Other plastic materials and percentage density may be substituted.

It will be clear from the foregoing that one or more of the plastic hinged one-piece guards 10 may be mounted as by the bolt 22, to extend transversely of a bumper 12 or other mounting structure, preferably with the hinge edge 18 above the bumper. The cover section 14 is then swung down over the foamed internal section 16 and the shoulders 26 pressed into latched relation with the shoulders 28 as indicated in FIG. 3. The guard 10 in its closed condition protects the bumper against impact by reason of the energy absorption character of the foamed section 16 and its compartments, the outer cover 18 distributing the force to the several walls 24. The hinge edge 18, being back of the projecting portion of the bumper 12, is not likely to be impaired if the impact is of moderate force. It the impact is such as to damage the guard, it is apparent that the guard itself is of economical construction and may be readily replaced. Moreover the guard covers may be selected of pleasing contrasting colors to add a safety feature at low cost.

Having thus described my invention what I claim as new and desire to secure as Letters Patent of the United States is:

1. A one-piece molded plastic guard comprising a pair of generally U-shaped sections one of which is foamed and the other of which is non-foamed, the sections being interconnected by a non-foamed hinge portion along a common edge, the foamed section being adapted to be secured to mounting structure and comprised of spaced, compartment-forming ribs defining air pockets, having energy dissipating properties, and the non-foamed section being closeable on the foamed section and said ribs to provide resistance to impact and protection for said structure.

2. A guard as in claim 1 wherein the non-foamed section is a relatively rigid cover having a latch formation remote from the hinge portion for cooperation with corresponding latching shoulders formed on the foamed section.

3. A guard as in claim 1 wherein the margin of each section along the common hinge edge is V-shaped.

4. A guard as in claim 1 wherein said ribs intersect right-angularly and the non-foamed section upon closure abuts the ribs endwise to define substantially air-tight compartments upon enveloping the foamed section.

5. A guard as in claim 4 wherein the sections are molded of ionomer resin.

6. A guard as in claim 4 wherein the foamed section is recessed snugly to receive a projecting portion of a bumper formed with an aperture, said foamed section is formed with a bore for receiving a first fastener for securing the foamed section to the bumper, and corresponding end portions of the sections remote from the hinge portion are formed with aligned holes for receiving a second fastener for permanently securing the guard, when in closed condition, to the bumper.

* * * * *